United States Patent
Dawson et al.

(10) Patent No.: US 6,387,853 B1
(45) Date of Patent: *May 14, 2002

(54) DERIVATIZATION OF POLYMERS AND WELL TREATMENTS USING THE SAME

(75) Inventors: Jeffrey C. Dawson, Spring; Subramanian Kesavan, Woodlands; Hoang V. Le, Houston, all of TX (US)

(73) Assignee: BJ Services Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,610

(22) Filed: Mar. 27, 1998

(51) Int. Cl.$^7$ .............................. C09K 3/00; C07H 1/00
(52) U.S. Cl. ................... 507/211; 507/209; 507/212; 507/214; 507/217; 507/922; 507/230; 536/108; 536/110; 536/63; 536/123; 536/123.1; 525/58; 525/61
(58) Field of Search ................... 507/209, 211, 507/212, 214, 217, 922, 230; 536/108, 110, 63, 123, 123.1; 166/305.1, 308; 525/58, 61

(56) References Cited

U.S. PATENT DOCUMENTS

| | | | |
|---|---|---|---|
| 3,302,717 A | 2/1967 | West et al. .................... 166/33 |
| 3,380,529 A | 4/1968 | Hendrickson ................ 166/33 |
| 3,483,121 A | * 12/1969 | Jordan ......................... 507/209 |
| 3,723,408 A | * 3/1973 | Nordgren ..................... 507/209 |
| 3,730,271 A | 5/1973 | Gall ............................ 166/294 |
| 3,826,311 A | 7/1974 | Szabo et al. ................ 166/295 |
| 3,893,510 A | 7/1975 | Elphingstone et al. ...... 166/295 |
| 3,937,283 A | 2/1976 | Blauer et al. ............... 166/307 |
| 3,953,338 A | 4/1976 | Straus et al. ............. 252/8.5 C |
| 3,980,136 A | 9/1976 | Plummer et al. ........... 166/280 |
| 3,995,705 A | 12/1976 | Fischer et al. ................ 175/69 |
| 4,021,545 A | 5/1977 | Nair et al. ................... 424/180 |
| 4,036,764 A | 7/1977 | Fischer et al. ........... 252/8.5 C |
| 4,088,190 A | 5/1978 | Fischer et al. .............. 166/274 |
| 4,094,795 A | 6/1978 | DeMartino et al. .... 252/8.55 R |
| 4,137,400 A | 1/1979 | DeMartino et al. ......... 536/114 |
| 4,282,928 A | 8/1981 | McDonald et al. ......... 166/274 |
| 4,316,810 A | 2/1982 | Burnham ................ 252/8.55 R |
| 4,321,367 A | 3/1982 | Cheng et al. | |

(List continued on next page.)

FOREIGN PATENT DOCUMENTS

| | | |
|---|---|---|
| EP | 0 280 341 A1 | 8/1988 |
| GB | 744276 | 2/1956 |
| GB | 1001481 | 8/1965 |
| GB | 1015849 | 1/1966 |
| GB | 1028723 | 5/1966 |
| GB | 2 116 227 A | 9/1983 |

OTHER PUBLICATIONS

Burnham, Harris, McDaniel, "Developments in Hydrocarbon Fluids for High Temperature Fracturing," Society of Petroleum Engineers of AIME, SPE 7546, pp. 1–7 (includes 4 pages of figures/drawings/tables), 1978.

Bilden, Kesavan, Dawson, "A New Polymer Approach Applicable for the Control of Water Production," Petroleum Network Education Conferences, pp. 1–10 (includes 4 pages of Figures), 1996.

Holm, "The mechanism of gas and liquid flow through porous media in the presence of foam," Soc. Petroleum Eng. AIME, #SPE 1848, 1967.

Beyer et al., "Flow behavior of foam as a well circulating fluid," Soc. Petroleum Eng. AIME, #SPE 3986, 1972.

Millhone et al., "Factors affecting foam circulation in oil wells," Soc. Petroleum Eng. AIME, #SPE 4001, 1972.

Blauer and Kohlhaas, "Formation fracturing with foam," Soc. Petroleum Eng. AIME, #SPE 5003, 1974.

Holm, "Status of $CO_2$ and hydrocarbon miscible oil recovery methods," Soc. Petroleum Eng. AIME, #SPE 5560, 1975.

Essary and Rogers, "Techniques and results of foam redrilling operations–San Joaquin Valley, California," Soc. Petroleum Eng. AIME, #SPE 5715, 1976.

Kanda and Schechter, "On the mechanism of foam formation in porous media," Soc. Petroleum Eng. AIME, #SPE 6200, 1976.

Aizad and Okandan, "Flow equation for foam flowing through porous media and its application as a secondary recovery fluid," Soc. Petroleum Eng. AIME, #SPE 6599, 1976.

King, "Factors affecting dynamic fluid leakoff with foam fracturing fluids," Soc. Petroleum Eng. AIME, #SPE 6817, 1977.

Rohret, "Stimulation of the niabrara formation using foamed methanol–water," Soc. Petroleum Eng. AIME, #SPE 7174, 1978.

Komar and Yost, "Practical aspects of foam fracturing in the devonian shale," Soc. Petroleum Eng. AIME, #SPE 8345, 1979.

Leach and Yellig, "Compositional model studies: $CO_2$–oil displacement mechanisms," Soc. Petroleum Eng. AIME, #SPE 8368, 1979.

Bernard et al., "Use of surfactant to reduce $CO_2$ mobility in oil displacement," Soc. Petroleum Eng. AIME, #SPE 8370, 1979.

(List continued on next page.)

Primary Examiner—Philip Tucker
(74) Attorney, Agent, or Firm—O'Keefe, Egan & Peterman, LLP

(57) ABSTRACT

Polymers are derivatized and then may be introduced into a wellbore, such as in a hydraulic fracturing treatment. A polymer may be a guar powder that is mixed with a organic solvent and derivatized using a derivatizing agent, such as sodium chloroacetate. The polymer is typically derivatized in bulk prior to introduction into the wellbore. The derivatized polymer may be hydrated and/or crosslinked prior to introduction into the wellbore.

53 Claims, No Drawings

U.S. PATENT DOCUMENTS

| | | | |
|---|---|---|---|
| 4,328,864 A | 5/1982 | Friedman | 166/274 |
| 4,330,450 A | 5/1982 | Lipowski et al. | 524/547 |
| 4,336,145 A | 6/1982 | Briscoe | 252/8.55 R |
| 4,350,601 A | 9/1982 | Mosier et al. | 252/8.55 R |
| 4,359,391 A | 11/1982 | Salathiel et al. | 252/8.55 C |
| 4,371,443 A | 2/1983 | Keeney | 252/8.55 C |
| 4,389,320 A | 6/1983 | Clampitt | 252/8.55 R |
| 4,415,463 A | 11/1983 | Mosier et al. | 252/8.55 R |
| 4,417,415 A | 11/1983 | Cysewski et al. | 47/1.4 |
| 4,466,890 A | 8/1984 | Briscoe | 252/8.55 R |
| 4,487,867 A | 12/1984 | Almond et al. | 524/42 |
| 4,488,975 A | 12/1984 | Almond | 252/8.55 R |
| 4,514,309 A | 4/1985 | Wadhwa | 252/8.55 R |
| 4,518,040 A | 5/1985 | Middleton | 166/280 |
| 4,571,422 A | 2/1986 | Symes et al. | 536/114 |
| 4,572,295 A | 2/1986 | Walley | 166/295 |
| 4,627,495 A | 12/1986 | Harris et al. | 166/280 |
| 4,670,501 A * | 6/1987 | Dymond et al. | |
| 4,679,631 A | 7/1987 | Dill et al. | 166/307 |
| 4,683,954 A | 8/1987 | Walker et al. | 166/307 |
| 4,753,659 A | 6/1988 | Bayerlein et al. | 8/561 |
| 4,798,888 A | 1/1989 | Symes et al. | 536/123 |
| 4,892,916 A * | 1/1990 | Hawe et al. | |
| 5,016,714 A | 5/1991 | McCabe et al. | 166/308 |
| 5,048,607 A | 9/1991 | Phelps et al. | 166/270 |
| 5,111,886 A | 5/1992 | Dovan et al. | 166/300 |
| 5,125,456 A | 6/1992 | Hutchins et al. | 166/295 |
| 5,128,462 A | 7/1992 | Zody | 536/114 |
| 5,145,012 A | 9/1992 | Hutchins et al. | 166/292 |
| 5,161,615 A | 11/1992 | Hutchins et al. | 166/295 |
| 5,203,834 A | 4/1993 | Hutchins et al. | 166/270 |
| 5,207,934 A | 5/1993 | Dovan et al. | 252/8.551 |
| 5,211,858 A | 5/1993 | Dovan et al. | 252/8.551 |
| 5,213,446 A | 5/1993 | Dovan | 405/128 |
| 5,217,074 A * | 6/1993 | McDougall et al. | 507/922 |
| 5,225,090 A | 7/1993 | Hutchins et al. | 252/8.551 |
| 5,226,480 A | 7/1993 | Dovan et al. | 166/300 |
| 5,233,032 A | 8/1993 | Zody et al. | 536/114 |
| 5,244,042 A | 9/1993 | Dovan et al. | 166/270 |
| 5,246,073 A | 9/1993 | Sandiford et al. | 166/295 |
| 5,247,995 A | 9/1993 | Tjon-Joe-Pin et al. | 166/312 |
| 5,263,540 A | 11/1993 | Dovan et al. | 166/278 |
| 5,268,112 A | 12/1993 | Hutchins et al. | 252/8.551 |
| 5,291,949 A | 3/1994 | Dovan et al. | 166/295 |
| 5,310,002 A | 5/1994 | Blauch et al. | 166/307 |
| 5,310,774 A * | 5/1994 | Farrar | |
| 5,335,733 A | 8/1994 | Sandiford et al. | 166/300 |
| 5,360,558 A | 11/1994 | Pakulski et al. | 252/8.551 |
| 5,386,874 A | 2/1995 | Laramay et al. | 166/300 |
| 5,416,158 A | 5/1995 | Santhanam et al. | 524/760 |
| 5,417,287 A | 5/1995 | Smith et al. | 166/308 |
| 5,418,217 A | 5/1995 | Hutchins et al. | 507/222 |
| 5,421,412 A | 6/1995 | Kelly et al. | 166/300 |
| 5,465,792 A | 11/1995 | Dawson et al. | 166/295 |
| 5,486,312 A | 1/1996 | Sandiford et al. | 252/315.1 |
| 5,559,082 A | 9/1996 | Sanner et al. | 507/273 |
| 5,575,335 A | 11/1996 | King | 166/280 |
| 5,735,349 A * | 4/1998 | Dawson et al. | |
| 5,783,628 A | 7/1998 | Yada et al. | 525/61 |
| 5,863,908 A | 1/1999 | Inoue et al. | 536/123 |
| 5,877,127 A | 3/1999 | Card et al. | 507/209 |

OTHER PUBLICATIONS

Driscoll et al., "Oil base foam fracturing applied to the niobrara shale formation," *Soc. Petroleum Eng. AIME*, #SPE 9335, 1980.

Holcomb et al., "Chemistry, physical nature, and rheology of aqueous stimulation foams," *Soc. Petroleum Eng. AIME*, #SPE 9530, 1981.

Wendorff and Ainley, "Massive hydraulic fracturing of high–temperature wells with stable frac foams," *Soc. Petroleum Eng. AIME*, #SPE 10257, 1981.

Reidenbach et al., "Rheological study of foam fracturing fluids using nitrogen and carbon dioxide," *Soc. Petroleum Eng. AIME*, #SPE 12026, 1983.

Watkins et al., "A new crosslinked foamed fracturing fluid," *Soc. Petroleum Eng. AIME*, #SPE 12027, 1983.

Maini and Ma, "Relationship between foam stability measured in static tests and flow behavior of foams in porous media," *Soc. Petroleum Eng. AIME*, #SPE 13073, 1984.

Harris and Reidenbach, "High–temperature rheological study of foam fracturing fluids," *Soc. Petroleum Eng. AIME*, #SPE 13177, 1984.

Cameron et al., "New insights on the rheological behavior of delayed crosslinked fracturing fluids," *Soc. Petroleum Eng. AIME*, #SPE 18209, 1988.

Brannon and Pulsinelli, "Breaker concentrations required to improve the permeability of proppant–packs damaged by concentrated linear and borate–crosslinked fracturing fluids," *Soc. Petroleum Eng. AIME*, #SPE 90–90 (PREPRINT), 1990.

Bullen, "Combination foam/fluid fracturing," *J. Canadian Petroleum Technology*, pp. 51–56, 1980.

Smith and Holcomb, "Foamed hydrocarbons: an effective and economical alternative to conventional stimulation methods," *Southwestern Petroleum Short Course*, pp. 65–72, no date available.

Holcomb and Wilson, "Foamed acidizing and selective diverting using stable foam for improved acid stimulation," *Southwestern Petroleum Short Course*, pp. 67–74, no date available.

Metzner et al., "A method for the measurement of normal stresses in simple shearing flow," *Transactions Soc. Rheology*, pp. 133–147 (1961).

Hanks and Bonner, "Transitional flow phenomena in concentric annuli," *Ind. Eng. Chem. Fundam.*, 10(1):105–112, 1971.

Lord et al., "General turbulent pipe flow scale–up correlation for rheologically complex fluids," *Soc. Petroleum Eng. J.*, pp. 252–258, Sep. 1967.

Hanks and Dadia, "Theoretical analysis of the turbulent flow of non–newtonian slurries in pipes," *AIChE J.*, 17(3):554–557, May 1971.

Blauer and Holcomb, "Foam fracturing shows success in gas, oil formations," *Oil and Gas Journal*, pp. 57–60, Aug. 4, 1975.

Eakin and Eckard, *Petroleum Engineer*, pp. 71–84, Jul. 1966.

"1: What foam is and how it's used," *World Oil*, pp. 75–77, Nov. 1969.

"2: Stable foam speeds well cleanout," *World Oil*, pp. 78–83, Nov. 1969.

Krug, "Foam pressure loss in vertical tubing," *Oil and Gas Journal*, pp. 74–76, Oct. 6, 1975.

Bentsen and Veny, "Preformed stable foam performance in drilling and evaluating shallow gas wells in Alberta," *J. Petroleum Tech.*, pp. 1237–1240, Oct. 1976.

Hanks and Larsen, "The flow of power–law non–newtonian fluids in concentric annuli," *Ind. Eng. Chem. Fundam.*, 18(1):33–35, 1979.

Holcomb, "Foam: for fracturing and acid stimulation," *Drilling*, p. 46, Jan. 1982.

Holcomb, "Foam: for fracturing and acid stimulation," *Drilling*, p. 130, Feb. 1982.

Holcomb, "Foam: for fracturing and acid stimulation," *Drilling*, p. 199, May 1982.

"Sand Concentrator for Foam Fracturing" Canadian Fracmaster, Ltd., two pages, no date available.

"Surfactants for Oilfield," Witco Oleo/Surfactants Group, 33 pages, no date available.

Neill et al., "Field and Laboratory Results of Carbon Dioxide and Nitrogen in Well Stimulation," *J. Petroleum Technology*, pp. 244–248, Mar. 1964.

Rhône–Poulence, *Surfactants for Energy*, pp. 1–5, 1991.

Texaco Chemical Company, *Our Chemical Products*, pp. 1–37, 1981.

* cited by examiner

DERIVATIZATION OF POLYMERS AND WELL TREATMENTS USING THE SAME

BACKGROUND OF THE INVENTION

1. Field of the Invention

This invention relates generally to derivatization of polymer materials and, more specifically, to the use of derivatized polymers in well treatments. In particular, this invention relates to the derivatization of polymers, such as polysaccharides, in liquid slurries that are subsequently introduced into a well as part of a well treatment, such as a hydraulic fracturing treatment.

2. Description of Related Art

Hydraulic fracturing of oil and gas wells is a technique routinely used to improve or stimulate the recovery of hydrocarbons, and is typically employed to stimulate wells which produce from low permeability subterranean formations. In such wells, recovery efficiency is typically limited by the flow mechanisms associated with a low permeability formation. Hydraulic fracturing is usually accomplished by injecting a fluid, typically proppant-laden, into a producing interval at a pressure above the fracturing pressure of the subterranean formation. This fluid induces a fracture in the reservoir and transports proppant into the fracture before leaking off into the surrounding formation. After the treatment, proppant remains in the fracture in the form of a permeable pack that serves to prop the fracture open. In this way the proppant path forms a conductive pathway for hydrocarbons to flow into the wellbore. Typically, viscous gels are employed as fracturing fluids in order to provide a medium that will adequately suspend and transport solid proppant materials, as well as to impair loss of fracture fluid to the formation during the treatment. Fracture width and geometry are determined, in part, by the viscosity of a fracturing fluid. Viscosity of most water-based fracturing fluids is typically obtained from water-soluble polymers such as guar gums, guar derivatives, and cellulose derivatives.

Further enhancement of fracturing fluid viscosity may be obtained by treating polymeric solutions with cross-linking agents, typically selected from titanium, aluminum, boron and zirconium based compounds, or mixtures thereof. Most typically, boron and zirconium based additives are employed. Boron cross-linkers are typically used with galactomannan polysaccharides such as guar gum and its derivatives, including hydroxypropyl guar ("HPG"), carboxymethyl guar ("CMG") and carboxymethylhydroxypropyl guar ("CMHPG"). Most typically, boron crosslinkers are employed with guar because it offers suitable performance at lower cost. Although gelation may be obtained by mixing zirconium-based additives with guar, the resulting gels are typically shear-sensitive and unstable. However, zirconium-based additives may be mixed with carboxymethylated guar derivatives such as CMG or CMHPG to form stable gels. Other suitable guar derivatives include alkylated carboxylated polymers such as methyl and ethyl carboxymethyl guar.

For a typical hydraulic fracturing operation derivatized polysaccharides, such as carboxymethylated guars, are usually commercially purchased from specialty polymer companies, such as Aqualon and Rhone-Poulenc. Polymers such as carboxymethylated guars are typically formed by derivatizing the guar seed endosperm, often referred to as a "split", which is generally semi-spherical in shape (about $\frac{1}{8}$" long and $\frac{1}{16}$" in diameter) and from about 0.5 $mm^3$ to about 1 $mm^3$ in volume. The relatively large size of guar splits make them favored as a polymer feedstock because they form a derivatized polymer product that is more easily isolated and purified without the need of washing with organic solvents. Derivatized products formed from fine polymer powders often require organic solvents to disperse the powders without caking. These organic solvents are typically expensive and environmentally unsound.

Guar splits are typically treated with aqueous caustic to cause swelling, and then exposed to a derivatizing agent, such as sodium chloroacetate ("SCA") in an amount necessary to provide a desired molar substitution ("M.S.") value, which is the ratio of moles of derivative to total moles of sugar. Typical guar split derivatization yields using SCA are about 60%, with about 40% of the SCA being consumed to form undesirable byproducts such as glycolic acid. Following derivatization, the splits are typically cooled and washed to remove excess caustic and unwanted byproducts before being dried and ground to a powder.

Among the disadvantages associated with the use of commercially purchased derivatized polysaccharides is lack of control over the M.S. value. The M.S. value affects a polymer's hydration rate, solution viscosity and salt tolerance. Properties of zirconium and titanium crosslinked polymer gels are also affected by the polymer M.S., including gelation rate, gel strength as a function of temperature, proppant suspension, fluid loss control and controlled gel degradation. The optimum value of each such property is often achieved at different M.S. values. Therefore, the optimum M.S. value for a given fluid system typically reflects a compromise of the optimum M.S. values for each property. In the same way, the optimum M.S. value may also differ among fracturing fluids. The desired nature of the properties associated with the M.S. value varies from well treatment to well treatment based upon, among other things, individual well and formation characteristics. Therefore several commercially purchased polymers of the same class, but having different M.S. values, typically must be kept in inventory.

Another disadvantage of commercially available derivatized polysaccharides is their relatively high cost. This cost reflects the amount of post-derivatization processing required to produce derivatized polysaccharide powders. Post-derivatization processing typically includes isolation, washing (such as with organic solvents), and packaging of the derivatized polysaccharide product. Furthermore, derivatization of commercial polysaccharides is typically less uniform than desirable. Although not wishing to be bound by theory, it is believed that derivatization of relatively large polysaccharide materials such as guar splits yields a particle having a large percentage of derivatized molecules concentrated near the outer surface of the particle, and a substantial percentage of underivatized molecules located in the interior of the particle. This is undesirable because a portion of the polymers having lower than desired M.S. values may exhibit poor response to crosslinking while those have excess derivatization may be overly responsive. It is believed that this situation may result in non-uniform gelation.

Recently, continuous mixing processes have been employed in the performance of hydraulic fracturing treatments. In a continuous mixing process, the polymer is carefully metered into a flowing aqueous stream enroute to the wellbore. Because precise metering is best accomplished by handling the polymer as a liquid rather than as a solid, polymer slurries are typically prepared by dispersing the polymer in an organic solvent base which contains suspending agents. Examples of typical organic solvents include hydrocarbon solvents, such as kerosene, diesel, etc. Suspending agents are typically organophilic clays and surfactants such as naphthalene sulfonate resins. Nonionic surfactants such as ethoxylated fatty alcohols are typically added to improve wetting and hydration. During a typical well treatment employing continuous mixing, a liquid polymer slurry is measured into a flowing stream of aqueous treatment fluid, typically in a manner that allows the polymer from about one to about four minutes to hydrate before the aqueous stream enters a blender. In the blender the polymer-laden aqueous well treatment fluid may be mixed with other additives, such as cross-linking agents and other additives such as surfactants, gel stabilizers, clay control additives and proppants, before being injected into a wellbore.

SUMMARY OF THE INVENTION

In one respect, this invention is both a method for forming derivatized polymer material in a slurry and, in another respect, is the derivatized polymer material contained in a slurry and produced by this method. This method includes the steps of combining a hydrocarbon-based slurry containing polymer material with a derivatizing agent under conditions such that the polymer material and the derivatizing agent react to form derivatized polymer material contained in the slurry. In one embodiment of this method, the hydrocarbon based slurry may include a hydrocarbon solvent that is at least one of diesel, kerosene, refined aliphatic oil, or a mixture thereof; and the polymer material may include a water soluble substantially high molecular weight polyhydric polymer such as a hydratable polysaccharide, hydratable derivatized polysaccharide, or a mixture thereof. Specific types of polymers that may be employed include at least one of guar, derivatized guar, derivatized cellulose, starch, polyvinyl alcohol, or a mixture thereof. In one typical embodiment, the polymer material includes guar particles having a size of between about 60 mesh and about 400 mesh. In the practice of one embodiment of this method, the derivatizing agent may include at least one of alkylene oxide, alkali metal haloacetate, haloacetic acid, or a mixture thereof. In another embodiment of this method, the derivatizing agent may include at least one of alkali metal haloacetate, haloacetic acid, or a mixture thereof. Specific examples of derivatizing agents include at least one of sodium chloroacetate, sodium bromoacetate, chloroacetic acid, bromoacetic acid, propylene oxide, or a mixture thereof; and, more typically, at least one of sodium chloroacetate, chloroacetic acid or a mixture thereof. In one typical embodiment of this method, the polymer material includes guar; the derivatizing agent includes sodium chloroacetate, chloroacetic acid, or a mixture thereof; and the derivatized polymer material includes carboxymethyl guar. In the practice of this method, the hydrocarbon based slurry containing polymer material typically includes a viscosifier and dispersant and, most typically, the viscosifier includes organophilic clay and the dispersant includes an ethoxylated alcohol. A further embodiment of this method includes the step of combining the slurry containing polymer material with a basic compound or alkaline material prior to the step of combining the slurry containing polymer material with the derivatizing agent; and also includes the step of combining the slurry containing derivatized polymer material with an acidic agent or compound after the step of combining the slurry containing polymer material with the derivatizing agent.

In another respect, this invention is a method for treating a well, including the steps of combining a polymer material with a hydrocarbon solvent to form a polymer-containing slurry; combining the polymer-containing slurry with a derivatizing agent under conditions such that the polymer material and the derivatizing agent react to form a derivatized polymer-containing slurry; combining the derivatized polymer-containing slurry with an aqueous solution under conditions such that the polymer material reacts with the aqueous solution to form a hydrated derivatized polymer-containing treatment fluid; and introducing the treatment fluid into the well. In one embodiment of this method, the polymer material typically includes a water soluble high molecular weight polyhydric polymer having a molecular weight of greater than about 100,000. In another embodiment of this method, the polymer material typically includes a hydratable polysaccharide, hydratable derivatized polysaccharide, or a mixture thereof. In one embodiment, specific examples of suitable polymers include, but are not limited to, at least one of guar, derivatized guar, derivatized cellulose, starch, polyvinyl alcohol, or a mixture thereof. In another embodiment, specific examples of suitable polymers include, but are not limited to, at least one of guar, hydroxypropyl guar, hydroxyethyl cellulose, or a mixture thereof. In yet another embodiment, the polymer material may include guar particles having a size of between about 100 mesh and about 325 mesh. In one embodiment, examples of suitable derivatizing agents include, but are not limited to, at least one of alkylene oxide, alkali metal haloacetate, haloacetic acid, or a mixture thereof In another embodiment, examples of suitable derivatizing agents include, but are not limited to, at least one of alkali metal haloacetate, haloacetic acid, or a mixture thereof. Specific examples of suitable derivatizing agents include, but are not limited to, at least one of sodium chloroacetate, sodium bromoacetate, chloroacetic acid, bromoacetic acid, propylene oxide, or a mixture thereof. Typically employed derivatizing agents include at least one of sodium chloroacetate, chloroacetic acid or a mixture thereof. In one typical embodiment of this method, the polymer material may include guar; the derivatizing agent may include sodium chloroacetate, chloroacetic acid, or a mixture thereof; and the derivatized polymer material may include carboxymethyl guar. In another typical embodiment of this method, the step of combining a polymer material with a hydrocarbon solvent to form a polymer-containing slurry includes dispersing from about 15% to about 50% powdered guar by weight of polymer to weight of final polymer slurry ("BWOS"or w/w) in the hydrocarbon solvent, and the step of combining the polymer-containing slurry with a derivatizing agent includes adding between about 4% and about 25% by weight chloroacetate by weight of polymer to the polymer-containing slurry. Another typical embodiment of the method includes the step of combining a viscosifier and a dispersant with the hydrocarbon solvent prior to the step of combining a polymer material with the hydrocarbon solvent to form a polymer-containing slurry, and most typically the viscosifier includes organophilic clay and the dispersant includes an ethoxylated alcohol. In another typical embodiment of the method, the well penetrates a subterranean formation and the step of introducing includes the step of injecting a contents of the hydrated derivatized polymer-containing treatment fluid into the subterranean formation at a pressure above a fracturing pressure of the subterranean formation. Another typical embodiment of the method includes the step of combining the hydrated derivatized polymer-containing treatment fluid with a crosslinking agent under conditions such that the crosslinking agent and the derivatized polymer material react to form crosslinked derivatized polymer material contained in the treatment fluid. Another typical embodiment of the method includes the steps of combining the polymer-containing slurry with a basic compound or alkaline material prior to the step of combining the polymer-containing slurry with the derivatizing agent; and combining the derivatized polymer-containing slurry with an acidic agent or compound prior to the step of introducing; most typically in this embodiment, the polymer material includes polymer particles having a size of between about 38 µm and about 600 µm, and the method further includes the steps of combining the polymer material with a hydrocarbon solvent to form the polymer-containing slurry prior to the step of combining the polymer-containing slurry with a basic compound or alkaline material; combining the derivatized polymer-containing slurry with an aqueous solution to form a treatment fluid after the step of exposing the derivatized polymer to the acid; and the step of introducing includes the step of introducing the treatment fluid into the well. Furthermore, in this embodiment, the organic solvent is at least one of diesel, kerosene, refined aliphatic oil, or a mixture thereof. In another typical embodiment, the step of combining the derivatized polymer-containing slurry with an aqueous solution occurs within a process stream in a continuous mixing process, and the step of introducing includes the step of introducing the process stream into the well immediately after the steps of combining the derivatized polymer-containing slurry with an aqueous solution.

In another respect, this invention is a method for treating a well, including the steps of combining a guar material with an hydrocarbon solvent to form a slurry containing guar material; combining the slurry containing guar material with a basic compound or alkaline material; combining the slurry containing guar material with a denvatizing agent under conditions such that the guar material and the derivatizing agent react to form derivatized guar material contained in the slurry; combining the slurry containing derivatized guar material with an aqueous solution to form a treatment fluid under conditions such that the derivatized guar material reacts with the aqueous solution to form hydrated derivatized guar contained in the treatment fluid; and introducing the treatment fluid into the well. In this method the derivatizing agent typically includes sodium chroroacetate, chloroacetic acid, or a mixture thereof. In one typical embodiment of this method, the derivatizing agent includes sodium chloroacetate, chloroacetic acid, or a mixture thereof; wherein the derivatized guar material includes carboxymethyl guar; and the method further includes the step of heating the slurry containing guar material to a temperature of between about 20° C. and about 90° C. prior to the reaction between the guar material and the derivatizing agent. In another typical embodiment, the well penetrates a subterranean formation and the step of introducing includes the step of injecting the treatment fluid into the subterranean formation at a pressure above a fracturing pressure of the subterranean formation. In yet still another embodiment, the method further includes the step of combining a contents of the treatment fluid containing hydrated derivatized guar with a crosslinking agent under conditions such that the crosslinking agent and the hydrated derivatized guar react to form crosslinked hydrated derivatized guar. In yet still another embodiment, the step of combining the slurry containing guar material with a derivatizing agent includes the step of combining a selected amount of the derivatizing agent with the slurry containing guar material to produce a derivatized guar material having a desired degree of substitution value, and even more typically, the amount of the derivatizing agent is selected to produce a derivatized guar material having a degree of substitution value of between about 0.05 and about 0.25.

DETAILED DESCRIPTION OF THE SPECIFIC EMBODIMENTS

Using embodiments of the disclosed method polymer materials may be derivatized to form derivatized polymer materials. These derivatized polymer materials include those typically used as rheological modifiers in well treatment fluids, especially fracturing fluids, used for treating oil and gas wells. As used herein, "well treatment fluid" means any fluid suitable for introduction into a wellbore during drilling, completion, workover, remedial or other well operations including, but not limited to, stimulation fluids (such as acid-containing fluids, condensate treatment fluids, scale removal or inhibitor fluids, asphaltene inhibitor or removal fluids, fracturing fluids with or without proppant, oxidizer-containing fluids, etc.), drilling fluids and muds, blocking gels, gravel pack fluids, frac pack fluids, clear fluids, foamed fluids, packer fluids, etc. Advantageously, embodiments of the disclosed method may be used to derivatize polymers in a continuous mixing process at a wellsite. Unexpectedly, this method results in a derivatized product which offers improved performance and stability, but at a lower cost than commercially-purchased derivatized polymers.

In the practice of the disclosed method, polymers that may be derivatized include, but are not limited to, substantially high molecular weight water soluble polymers containing alcohol functional groups. Examples include, but are not limited to, substantially high molecular weight water soluble polyhydric alcohol polymers such as hydratable polysaccharide polymers, polyvinyl alcohol polymers and copolymers thereof. As used herein "high molecular weight polymer" means a polymer typically having a molecular weight greater than about 100,000, and more typically greater than about 500,000. Suitable hydratable polysaccharide polymers include, but are not limited to, polygalactomannans, polyglucomannans, galactomannan gums, guars, cellulose materials, starches, xanthans, and similar materials, as well as derivatives thereof. Suitable polygalactomannans include, but are not limited to, those polysaccharides composed primarily of galactose and mannose units. Among other sources, polygalactomarnans are typically found in endosperm of leguminous seeds, such as guar, locust bean, honey locust, flame tree, and cassia occidentialis. Specific examples of suitable polysaccharide polymers include, but are not limited to, guar gum, locust bean gum, xanthan gum, karaya gum, carrageenan, agar and the like, as well as derivatives thereof. Additional information on hydratable polymers may be found, for example, in U.S. Pat. No. 5,247,995, which is incorporated by reference herein. Furthermore, in the practice of the disclosed method polymer powders are typically used for derivatizing.

In the practice of the disclosed method, typical polygalactomannans include guar gum and locust bean gum. Guar gum is composed primarily of a polygalactomannan which is essentially a straight-chain mannan with single-membered galactose branches. The ratio of galactose to mannose in the guar polymer is typically 1:2. In guar, mannose units are typically linked in a 1,4 β-glycositic linkage with galactose units attached by means of a 1,6 linkage on alternate mannose units. Typically, fracturing fluid quality guar gum has a molecular weight of about 2,000,000. Locust bean gum is a similar polygalactomannan gum, having a ratio of galactose to mannose of 1:4. Typical commercial sources of guar gum and locust bean gum include Rhone Poulenc and Aqualon. Most typically, fracturing fluid quality guar or locust bean gums available from these suppliers is employed.

It will be understood with benefit of the present disclosure that in addition to those polymers described above, the disclosed method may be practiced with any other polymer materials suitable for derivatization. For example, derivatized polymers may be used as a starting material and further derivatized using the disclosed method. Specific examples include derivatization of hydroxyethyl cellulose or hydroxypropyl guar to carboxymethylhydroxyethyl cellulose or carboxymethylhydroxypropyl guar, respectively. Synthetic polyhydric polymers such as polyvinyl alcohol may also be derivatized by using the disclosed method to make, for example, carboxymethyl polyvinyl alcohol.

In the practice of the disclosed method, any derivatizing agent suitable for derivatizing polymers such as polysaccharides may be employed. Suitable derivatizing agents include, but are not limited to, alkylene oxides, haloacetates and haloalkylquaternary ammonium halides such as chloroethyl trimethylammonium chloride, or mixtures thereof. Typically, agents capable of derivatizing polygalactomannans are employed. For example, hydroxyalkylgalactomannan gums may be made by reacting galactomannan gums with an alkylene oxide having two or more carbon atoms. In this case, reactive hydroxyl groups on the galactomannan molecules react with alkylene oxides to produce a hydroxyalkylether of the gum in a manner as described, for example, in U.S. Pat. No. 3,483,121; U.S. Pat. No. 3,723,408; U.S. Pat. No. 5,128,462; U.S. Pat. No. 5,233,032; U.S. Pat. No. 4,137,400; and U.S. Pat. No. 4,094,795; which are incorporated herein by reference. Typically, alkylene oxides having from 2 to 8 carbon atoms are employed. Other typical derivatizing agents include those agents suitable for producing alkylethers, carboxyalkylethers, hydroxyalkylether-carboxyalkylethers mixed derivatives, other mixed derivatives (such as mixed hydrophobic hydrophilic derivatives), and N,N-dialkylalkylcrylamide derivatives (such as N,N-dialkymethacrylamide) of polygalactomannans as described in the above-listed references.

Derivatized polysaccharide polymers which are typically produced according to the disclosed method include, but are not limited to, derivatized guars, guar gum derivatives, starches and polyvinyl alcohol and cellulose derivatives. Specific examples include, but are not limited to, carboxymethyl guar (sodium carboxymethyl guar), hydroxypropyl guar, carboxymethylhydroxypropyl guar, carboxymethyl cellulose, carboxymethylhydroxyethyl cellulose, hydroxyethyl cellulose, carboxymethyl starch, carboxymethyl polyvinyl alcohol, etc. Most typically in the practice of the disclosed method, derivatized guar materials are produced.

Typical guar derivatizing agents include, but are not limited to, alkylene oxides, haloacetic acids such as chloroacetic acid ("CAA") and alkali metal haloacetates including, but not limited to, sodium chloroacetate ("SCA") and its analogs, such as sodium bromoacetate ("SBA"). When used as derivatizing agents, alkylene oxides produce hydroxyalkyl guar derivatives, while acetate-based derivatizing agents produce carboxymethylated guar derivatives. Most typically in the practice of the disclosed method, propylene oxide is used to produce hydroxypropyl guar. Chloroacetic acid and sodium bromoacetate are typically used to produce carboxymethyl guar. Carboxymethylhydroxypropyl guar (CMHPG) may also be produced by sequentially using propylene oxide and chloroacetic acid. For long term storage of a slurry, haloacetic acids are typically used due to excessive water contamination which may occur with slurries using the alkali metal haloacetate process.

In the practice of the disclosed method, liquid polymer slurries are typically utilized to form derivatized polymers. As used herein "slurry" includes those mixtures in which a polymer is dispersed in a substantially inert solvent such as a hydrocarbon based liquid. Typically, such slurries are comprised of solid polymer material dispersed in an organic solvent. Acceptable organic solvents include any organic liquid suitable for forming a polymer slurry. Typical examples include diesel, kerosene, refined aliphatic oils such as Exxon's "ESCAID 110", and/or mixtures thereof Other examples of suitable organic solvents include, but are not limited to, alcohols (such as t-butanol and isopropanol), alkanes having greater than about 5 carbon atoms (such as heptane and hexane), etc.

Although not necessary, a typical organic solvent slurry base also includes one or more suspending agents such as organophilic clays (like, for example, "CLAYTONE IMG-400," (commercially available from Southern Clay) and/or surfactants (like, for example, napthalene sulfonate resins. Nonionic surfactants such as ethoxylated nonylphenols or ethoxylated fatty alcohols may also be added to improve wetting and hydration.

Suitable polymers for use in the practice of the disclosed method include polymers such as those materials discussed above, as well as any other polymer materials that may be used to form an organic slurry for derivatizing polysaccharides. Acceptable forms of polymers include any solid form suitable for forming a slurry in an organic solvent for derivatizing polymers. Specific examples include, but are not limited to, relatively large polymer particles such as seed endosperms and relatively small polymer particles such as powders. Most typically powders are used, especially those powders offering the highest surface area without being subject to agglomeration during the process. Typically, powders having a size of between about 600 $\mu$m and about 38 $\mu$m, more typically between about 250 $\mu$m and about 45 $\mu$m, are used in order to obtain more uniform derivatization.

In the practice of the disclosed method, guar powders are typically employed. Among these are any guar powders suitable for derivatizing. Typically, powdered guar having a size of between about 60 mesh and about 400 mesh, more typically between about 100 and about 325 mesh, is employed. Advantageously, the ratio of particle surface area to number of polymer molecules in such powdered guars is typically much higher than the particle surface area to polymer molecule ratio of guar split particles. This higher ratio tends to provide greater surface area exposed for derivatization and typically yields more uniform and random substitution of the derivatizing agent. Most typically, a fracturing fluid grade guar powder known as "GUAR X0694-17-1" and available from Aqualon (Hercules, Inc.) is used. Most typically in the practice of the disclosed method, a polymer slurry is 100-325 mesh powdered guar dispersed in a diesel hydrocarbon solvent in a concentration of between about 15% and about 50% BWOS, and most typically between about 25% and about 45% BWOS. As used herein, "BWOS" refers to the weight of a component by weight of the final slurry.

Using the disclosed method, and with benefit of this disclosure, a polymer slurry may be formed using any suitable method known to those of skill in the art and may be prepared onsite or offsite. For example, one or more viscosifiers or suspending additives may be first added to a hydrocarbon solvent to suspend polymer particles and, in another embodiment, after viscosifier or suspending agent/s are added, surfactants may be added followed by polymer particles. Although any amount and/or type of viscosifier suitable for achieving desired slurry dispersal may be employed, in one typical embodiment an organophilic clay is added to a hydrocarbon solvent at concentrations of typically from about 0.2% to about 1.0% BWOS by weight of hydrocarbon solvent In other embodiments, greater or lesser amounts are possible. A specific example of a typical organophilic clay is CLAYTONE IMG-400, available from Southern Clay Products of Gonzalez, Tex.

In one typical embodiment, after adding viscosifier a dispersant, such as a surfactant for dispersing and/or wetting may be added, followed by polymer particles. Typical dispersants include, but are not limited to, surfactants such as ethoxylated nonylphenols and/or ethoxylated fatty alcohols. However, any surfactant or mixture of surfactants suitable for acting as a dispersant and/or water wetting polymer particles in a hydrocarbon solvent may be employed. Typically, such surfactants are liquid and nonionic, although solid surfactants may also help fulfill this role. Examples of suitable surfactants include, but are not limited to, alcohol ether sulfates, liquid ethoxylated alcohols, nonylphenol ethoxylates, mixtures thereof, etc. In one typical embodiment, a liquid ethoxylated alcohol surfactant may optionally be employed. In this regard, a most typical liquid ethoxylated alcohol is an ethoxylated tridecyl alcohol known as "ICONOL TDA-6" and available from BASF. Examples of typical solid surfactant compositions include, but are not limited to, solid alpha olefin sulfonates, alcohol ethoxylates, alcohol ether sulfates, betaines, sulfosuccinate esters, alkyl sulfates, allyl aryl sulfonates, and mixtures thereof.

Other suitable ethoxylated alcohol wetting surfactants include, but are not limited to, "L610-3" available from Huntsman, "L12-3" available from Huntsman, "SYNPERONIC 13/5" available from ICI, "SYNPERONIC 13/8" available from ICI. Suitable secondary alcohol ethoxylates include, but are not limited to "TERGITOL 15-S-9" available from UNION CARBIDE and "TERGITOL 15-S-5" available from UNION CARBIDE. Other suitable surfactants include, but are not limited to polyethylene glycol diester of oelic acid, "400-DO" available from RP; ethox sorbitan monooleate, "PSMO-20" available from RP; and ethox castor oil, "EL-620" available from RP.

When used, a surfactant is typically employed in an amount of from about 0.1% to about 2% BWOS, more typically from about 0.25% to about 1% BWOS, and most typically about 0.5% BWOS.

In the practice of the disclosed method, a polymer slurry may comprise, among other things, any combination of polymer particles, viscosifiers, and/or surfactants. Furthermore, in any given polymer slurry, each of the above-mentioned components (when employed) are typically present in a polymer slurry in the amounts or concentrations mentioned above. Other additives may also be present including, but not limited to, alcohols and similar solvents that do not substantially react with derivatizing agent. In this regard, alcohol solvents are most typically tertiary alcohols and water content is typically minimized. For example, in one most typical embodiment for a D.S. value of about 0.17, a polymer slurry when combined with a derivatizing agent typically includes about 29% polysaccharide (most typically guar gum) by weight per weight of final slurry ("BWOS"), about 0.6% clay suspending agent (most typically CLAYTONE IMG-400 organophilic clay) BWOS, about 0.3% dispersing surfactant (most typically ICONOL TDA-6 liquid ethoxylated alcohol) BWOS, about 50.9% hydrocarbon solvent (most typically No. 2 diesel hydrocarbon solvent), about 7.2% alcohol solvent (most typically t-butanol) BWOS, 8.2% of 50% aqueous caustic BWOS, and about 3.8% derivatizing agent (typically chloracetate or chloroacetic acid) BWOS.

When derivatization is performed as part of a wellsite operation, a slurry may be prepared offsite and transported to the well location, or alternatively may be prepared onsite. Onsite preparation of a polymer slurry is typically performed by mixing in substantially the same sequence and fashion as that offsite. Advantageously, when used either as part of a continuous mixing or batch process for well treatment operations, washing of the polysaccharide derivative product is unnecessary.

In the practice of the disclosed method, derivatization of polymers, regardless of type, is typically performed as a batch process. After derivatization is substantially completed, the mixing of the fracturing fluid components, for example, at a well site, may be prepared either by batch or continuous mix methods. Derivatization is typically accomplished by the reaction of a derivatizing agent with polymer material contained in a slurry. Typically this reaction is performed in a substantially inert or substantially carbon dioxide-free and substantially non-oxidizing (e.g., oxygen free) atmosphere to prevent polymer oxidation and/or degradation, and in the presence of a basic compound or alkaline agent to swell the polymer particles and activate the derivatizing sites on the polymer by, for example, forming alkoxide (the anion of an alcohol). A stoichiometric excess of basic compound or alkaline agent based on the weight of derivatizing agent is typically employed to ensure activation of derivatization sites following neutralation of acid content (such as hydrochloric acid) resulting from reaction. In this regard a stoichiometric excess of greater than about 100%, more typically greater than about 125%, and most typically greater than or equal to about 150% based on the weight of derivatizing agent, of basic compound or alkaline agent required to activate polymer derivatization sites is typically employed.

Acceptable basic compounds and alkaline agents include, among other things, any agent suitable for swelling the polymer particles, forming alkoxides and which does not react substantially with a derivatizing agent. Examples of suitable basic compounds and alkaline agents include, but are not limited to, inorganic and organic derivatives such as alkali metal and alkaline earth metal hydroxides, quaternary ammonium hydroxides, alkoxides, organic acid salts, and the like. Illustrative of specific basic compounds are sodium hydroxide, potassium hydroxide, calcium hydroxide, barium hydroxide, sodium carbonate, potassium acetate, sodium methoxide, tetramethylammonium hydroxide, and the like, caustic (sodium hydroxide), or mixtures thereof. Typically, caustic (NaOH), a mixture of caustic and potassium hydroxide, or potassium hydroxide is employed. Most typically, caustic is employed. In this regard, caustic amount (expressed as 100% active caustic) typically ranges between about 4 and about 25% (based on the weight of polymer) and typically depends on the degree of substitution desired. As used herein degree of substitution ("D.S.") means number of hydroxyl groups on each pyrannoside sugar occupied by the derivative. One typical formulation uses about 4.5% caustic by weight of polymer to achieve an intended D.S. of about 0.05, another typical formulation uses about 22.6% caustic by weight of polymer to achieve an intended D.S. of about 0.25. In a most typical embodiment, a D.S. of about 0.17 is achieved. This is so because a byproduct of the reaction is hydrochloric acid, and the higher the D.S., the greater amount HCl is produced. Table 1 gives example embodiments based on derivatizing one sugar MW=162).

TABLE 1

| D.S. | Sodium Chloroacetate (Moles) | Chloroacetic Acid (Moles) | Sodium Chloroacetate (%) | Chloroacetic Acid (%) | Caustic (Moles) | 100% Caustic (%) | 50% Caustic (%) |
| --- | --- | --- | --- | --- | --- | --- | --- |
| 0.05 | $5.4 \times 10^{-4}$ | $5.14 \times 10^{-4}$ | 6.0 | 4.8 | $1.132 \times 10^{-3}$ | 4.5 | 9.0 |
| 0.17 | $1.75 \times 10^{-3}$ | $1.75 \times 10^{-3}$ | 20.4 | 16.5 | $3.848 \times 10^{-3}$ | 15.4 | 30.8 |
| 0.25 | $2.57 \times 10^{-3}$ | $2.57 \times 10^{-3}$ | 30.0 | 24.3 | $5.66 \times 10^{-3}$ | 22.6 | 45.3 |

An inert atmosphere may be provided by degassing with nitrogen, helium, argon, or any other gas that does not substantially inhibit or interfere with the derivatizing reaction. Alternatively, derivatization may be carried out in the absence of a gaseous atmosphere. The purpose of degassing is to remove diatomic oxygen molecules from the system. Oxygen under alkaline conditions can dramatically degrade polysaccharides. Therefore, any method capable of displacing or otherwise removing oxygen molecules from a reaction mixture, such as by using a vacuum may be employed.

In a most typical embodiment, a polymer slurry including dispersed guar powder is exposed to low volumes of caustic (typically in the form of commercially available 50% aqueous sodium hydroxide) prior to derivatization. Typically, as previously mentioned caustic (expressed as 100% active (dry) caustic) is employed in an amount from about 4% to about 25% by weight of polymer, and most typically from about 12% to about 18% by weight of polymer, although any other amount suitable for catalyzing a derivation may be employed.

Derivatization is accomplished by combining a slurry containing polymer particles or combined with a derivatizing agent under conditions such that the polymer and derivatizing agent react to form a derivatized polymer. As used herein, the term "combining" includes any method suitable for admixing, exposing, contacting, or otherwise causing two or more materials, compounds, or components to come together in a manner sufficient to cause at least partial reaction and/or at least partial mixing to occur between the components. Examples of suitable methods of combining include, but are not limited to, adding one component to another component or vice versa, simultaneously adding together streams or batches of one or more components, and adding components sequentially. In the case of treating a polymer slurry with a derivatizing agent, such suitable combining methods include, but are not limited to, adding derivatizing agent to polymer slurry, adding polymer slurry to derivatizing agent, simultaneously mixing streams of polymer slurry and derivatizing agent, and any combination thereof. In conjunction with these methods of combining, derivatization is typically accomplished using batch mix processes.

In embodiments of the disclosed method employing guar particles, a derivatization agent is typically at least one of sodium chloroacetate ("SCA"), sodium bromoacetate ("SBA"), or chloroacetic acid, bromoacetic acid, or mixtures thereof. Typically, such a derivatizing agent is added to a guar powder slurry in any amount suitable for achieving the desired D.S. under reaction conditions. Typically a derivatizing agent is added in an amount of between about 4% and about 25% based on weight of polymer, most typically between about 12% and about 17% based on weight of polymer. In this regard, a derivatizing agent may be added to a polymer slurry in any suitable manner known to the art, for example as a dry powder or solution. Most typically derivatizating is added as an about 40% solution in either water or alcohol (such as methanol, ethanol, propanol, butanol, or mixtures thereof).

Prior to or following addition of a derivatizing agent/s, a polymer slurry may be heated to a temperature appropriate for obtaining sufficient and timely derivatization of the polymer material using the particular derivatizing agent/s. For example, when derivatizing a guar powder slurry using SCA, the slurry is typically heated to a temperature of between about 20° C. and about 90° C., most typically between about 50° C. and about 70° C. Advantageously, when SBA is used as a derivatizing agent, a relatively low reaction temperature of typically between about 20° C. and about 70° C., more typically between about 20° C. and 50° C. is employed. Thus, depending on the ambient temperature, no heating may be needed.

In the case of the derivatization of guar powders using SCA or SBA a reaction time of between about 1 hr. and about 6 hr., more typically between about 2 hr. and about 5 hr., and most typically about 3 hr., is provided to allow complete derivatization. Heating times and temperatures will vary according to particular combinations of polymer particles and derivatizing agents, and may be determined and adjusted for other polymer materials and/or denvatizing agents with benefit of this disclosure and using techniques known to those of skill in the art.

During derivatization, process control parameters that may affect the degree and success of derivatization reactions include stochiometry, reaction time, temperature control, and maintenance of an inert atmosphere during the derivatization reaction. With benefit of this disclosure, adjustment of temperature, reaction time, and stochiometry may be made using techniques known to those of skill in the art to produce the desired derivatized product. Typically, a derivatization reaction may be controlled to provide better yields by reducing temperature, controlling stochiometry and extending reaction time. For example, the required amount or concentration of a derivatization agent relative to concentration of polymer material that is required to obtain a desired degree of molar substitution may be determined and adjusted. As a specific example for derivatizing 29% BWOS guar gum in a hydrocarbon-based slurry, the concentration of a chloroacetic acid derivatization agent is typically about 16.5% (based on guar gum) and the slurry is typically heated to about 60° C. for about 3 hours to produce a carboxymethyl guar having a D.S. of about 0.17. In this way, the disclosed method allows the characteristics of a polymer to be customized at the wellsite to fit particular criteria. For most applications, polymers with D.S. of about 0.10 to about 0.17 appear to function well as fracturing fluids, although the disclosed method may be used to make polymers having D.S. values up to or exceeding about 0.25. In contrast, most commercial processes are capable of making polymers with D.S. values of up to about 0.15.

Although not required in the practice of the disclosed method, a derivatized polymer slurry may be treated with relatively small volumes of an acidic agent or compound to consume any excess alkaline material remaining from the derivatization step, for example, to allow or facilitate polymer hydration. When such neutralization is desired, any acidic agent or compound suitable for neutralizing a polymer slurry may be employed. For example, typical neutralizing acids include, but are not limited to, fumaric acid, formic acid, sodium diacetate, sulfamic acid, acetic acid, glacial acetic acid, hydrochloric acid, mixtures thereof, etc. Most typically acetic acid is utilized. Alternatively, a buffered aqueous solution may be employed to achieve a hydrated polymer solution having a desired pH, for example a pH in the range described below. In this regard, one buffered solution typically employs sodium bicarbonate and fumaric acid.

In one embodiment, "neutralization" is achieved by adding sufficient acidic agent to adjust the pH of a hydrated polymer solution to be from about 4 to about 10, more typically from about 6 to about 8.5. After heating and derivatization, a slurry may be cooled prior to neutralization if desired. Cooling may be desirable, for example, before neutralizing the excess caustic with an acid such as hydrochloric acid, fumaric acid, glacial acetic acid or acetic acid. In such cases, neutralizing at reaction temperatures may cause polymer degradation. In the case of a derivatized guar slurry, the slurry is typically cooled to a post derivatization temperature of between about 20° C. and about 30° C.

When used onsite to produce derivatized polymers for well treatments, a polysaccharide is typically derivatized in bulk using batch methods prior to introduction into a wellbore as part of a batch or continuous mix well treatment. In this regard, polymer powder may be dispersed in an organic solvent, derivatized and stored onsite prior to the time the well treatment is introduced into the wellbore. Derivatization is typically performed offsite, though onsite batch derivatization is also possible. When derivatized offsite, a derivatized slurry may be typically transported, trucked, to the wellsites.

When a combination of polymer, derivatizing agent and ambient temperature dictates heating for the derivatization process, with benefit of this disclosure any suitable method known to those of skill in the art for heating a well treatment fluid may be employed. For example, a polymer slurry or precursor to a polymer slurry may be circulated through a conventional heater treated to obtain the necessary temperature. Typically, a substantially inert or substantially non-oxidizing atmosphere is provided by maintenance of a nitrogen gas blanket in process vessels. A polymer slurry may be derivatized in any vessel suitable for containing and supporting the derivatization reaction including, but not limited to, frac tanks, reactor vessels, etc. Most typically, a reactor or modified vessel, such as those known in the art to be suitable for mixing hydrocarbon-based polymer slurries is employed. Most typically, degassing is accomplished by submerging a tube under the slurry surface and sparging with inert gas while stirring. Any given amount of derivatized slurry may be produced in a given batch treatment, though typically a batch is only as large as required for a given well treatment For example, a large fracturing treatment may use up to about 1,000,000 gallons of polymer solution and typically requires about 10,000 gallons of slurry. However, most fracture treatments require about 1,000–2,000 gallons of slurry.

Following derivatization, a derivatized polymer slurry may be stored for later use. With benefit of this disclosure and using methods and materials known to those of skill in the art, a stored or pre-derivatized polymer slurry may be combined with an aqueous solution or treatment fluid and other components (such as one or more crosslinkers, proppants, breakers, clay protection agents, etc.), including those as previously described herein prior to introduction into a wellbore. Typical clay protection agents include, but are not limited to, aqueous solutions of tetramethlammonium chloride, potassium chloride, etc. Examples of typical crosslinking agents include, but are not limited to, those described in U.S. Pat. No. 4,514,309 and U.S. Pat. No. 5,247,995, which are incorporated herein by reference.

As used herein, "introduced into a wellbore" includes pumping, injecting, pouring, releasing, displacing, spotting, circulating or otherwise placing a material within a well or wellbore using any suitable method known in the art. Typically, crosslinking agents are added to a hydrated polymer solution, i.e., after combination with aqueous treatment fluid. An aqueous treatment fluid may be heated if desired, as described above by circulation through a conventional heater treated, or by any other suitable means. It will be understood with benefit of the present disclosure that a polymer slurry may be formed and/or introduced into a well in other ways. For example, the polymer in the slurry may be solvated in an alcohol (methanol) based solvent.

As described above, use of the disclosed method to derivatize polymers advantageously results in a substitution reaction which may produce derivatizied polymers typically having more uniform derivatization than commercially available derivatized polymers. Furthermore, when used to derivatize polymers for well treating purposes, the disclosed method typically does not require post derivatization processing, such as isolation, washing, purification (such as by washing with organic solvents) and/or packaging of the polymer, thereby reducing costs.

Finally, the disclosed method allows production of customized polymer compositions by allowing the manipulation of the D.S. value, and thus allows the characteristics of a polymer to be customized, for example, to fit particular wellbore or downhole criteria In one most typical embodiment, a derivatized polymer of the disclosed method has a D.S. value of between about 0.05 and about 0.25, and more typically between about 0.10 and about 0.17, although values outside these ranges are possible. In this regard, concentration of alkaline agent (such as caustic) and derivatizing agent employed to achieve a derivatized polymer is related to desired D.S. value and polymer concentration in a given slurry and, with benefit of this disclosure, may be determined by those of skill in the art. Most typically, such a derivatized polymer is a derivatized guar material.

Although use of the disclosed method for derivatizing polymers for use in hydraulic fracturing treatments has been described above, it will be understood with benefit of the present disclosure that the disclosed method may also be employed to produce derivatized polymers for use in other types of well operations and treatments. Examples include any treatment or operation that may benefit from the use of derivatized polymer materials including, but not limited to, drill-in, drilling, completion, cementing, stimulation, workover and remedial operations. Specific examples of treatment fluids include drilling muds and lost circulation compositions, drill in fluids, gravel pack fluids, frac pack fluids, gel cleanout fluids, blocking gels, gelled acid fluids or other similar treatments employing gels, foamed fluids, etc.

EXAMPLES

The following examples are illustrative and should not be construed as limiting the scope of the invention or the claims thereof.

Example 1—Derivatization of Guar 120.0 g of fracturing fluid quality guar ("GW-4" available from Rhone Poulenc) was added to 210.0 g of "ESCAID 110", a refined aliphatic oil available from Exxon. The resulting slurry was rapidly stirred in a resin kettle while degassing with $N_2$ for about 20 minutes Then, 19.0 g of 40% aqueous caustic was added dropwise over a time period of about ten minutes. The slurry was continuously degassed for about thirty minutes to allow maximum particle swelling to occur. After swelling, 52.33 g of aqueous sodium chloroacetate was added dropwise over a time period of about fifteen minutes. After about 90% of the sodium chloroacetate had been added, the slurry was heated to 85° C. for two hours and then cooled. The solids in the slurry were then isolated by vacuum filtration, washed twice with 80% aqueous methanol, and dried. A 0.48% by weight of solution of this derivatized polymer was prepared in deionized water and was found to have a Fann 35 (R1B1 cup and bob geometry) viscosity of 38 centipoise ("cp"), and a D.S. value of 0.14.

Example 2—Crosslinking and Evaluation of Rheological Properties

The polymer derivatized in Example 1 was evaluated for its rheological performance as the gelant in a fracturing fluid. The fluid was prepared by hydrating 1.80 g of polymer in 1L of water. After mixing for about 30 minutes, 1 ml of a 50% aqueous tetramethylammonium chloride solution was added, followed by 1.2 g sodium thiosulfate. The pH of the solution was increased by adding 0.5 ml of 46% aqueous KOH. Lastly, 0.7 ml of a zirconium lactate crosslinking agent (5.3% $ZrO_2$) was added under conditions of excessive shear (using a Waring Blender) for thirty seconds. The resulting product was a viscous semi-solid gel.

To test the resulting gel, 45 g of gel was placed into a Fann "50C" cup (RlBl cup and bob geometry) and the cup positioned back onto the Fann "50C" viscometer. The sample was pressured to about 100 psi with $N_2$ and was pre-conditioned by shearing at 105 $sec^{-1}$ for 60 sec. Afterward, a rate sweep, using 105, 84, 63 and 42 $sec^{-1}$, was made and repeated every 30 minutes The shear rate and corresponding stresses were used to determine the Power Law indices, n' and K. This procedure is described in American Petroleum Institute publication RP-39, Recommended Practice Standard Procedure for the Evaluation of Hydraulic Fracturing Fluids. The Power Law indices were then used to calculate the fluid viscosities at 105, 85 and 42 $sec^{-1}$ as shown in Table 2. After the initial rate sweep, the fluid was heated to 225° F for the duration of the test. The interim rate between sweeps was 105 sec.$^{-1}$. The data reported in Table 2 suggests satisfactory stability and performance at this temperature was achieved with a relatively low polymer concentration. More specifically, this example shows that a polymer derivatized using the disclosed method may be used to produce viscous gels suitable for hydraulic fracturing processes.

Example 3—Crosslinking and Evaluation of Rheological Properties at Low pH

The polymer derivatized in Example 1 was evaluated for its Theological performance as the gelant in a low pH fracturing fluid. The fluid was prepared by hydrating 1.80 g of polymer in 1L of water. After mixing for about 30 minutes, 1 ml of a 50% aqueous tetramethylammonium chloride solution was added and the pH of the solution was reduced to 4.5 with 0.5 ml of glacial acetic acid. Lastly, 0.5 ml of a zirconium lactate crosslinking agent (5.3% $ZrO_2$) was added with excessive shear for thirty seconds. The product formed was a semi-solid gel.

To test the resulting gel, 45 g of gel was placed into a Fann "50C" cup (and the cup positioned back onto the Fann "50C" viscometer). The test method described in Example 2 was repeated except that the test temperature was 150° F. As shown in Table 3, the derivatized polymer exhibited satisfactory stability and performance at relatively low polymer concentrations. More specifically, this example shows that a guar polymer derivatized under relatively low pH conditions, may be used to form gels that are applicable for fracturing fluids. In this regard, underivatized guar gum generally does not crosslink in low pH environments and the viscosity is very unstable while heating.

Example 4—Derivatization of Guar at Ambient Temperature

In this example, the sodium chloroacetate used in Example 1 was replaced with sodium bromoacetate. This substitution allowed the derivatization reaction to proceed at ambient temperature.

The derivatization process began by adding 120.0 g of fracturing fluid quality guar ("GW-4" from Rhone Poulenc) to 210.0 g of "ESCAID 110" (from Exxon). The dispersion was degassed with $N_2$ and stirred in a 500 ml resin kettle for about 90 minutes. Afterward, 14.34 g of 50% aqueous caustic solution was added dropwise over about 12 minutes. After an additional 10 minutes to allow swelling, a solution composed of 33.02 g bromoacetic acid, 40.0 g deionized water and 20.03 g of 50% aqueous caustic was mixed to form a solution having a final pH of 6.60. The temperature of this solution was 28° C. This solution was added dropwise to the slurry, which had a temperature of 24° C. The interaction of the swollen particles with the sodium bromoacetate was exothermic and generated temperatures up to 32° C. The addition took about 15 minutes followed by an additional three hours of stirring while degassing. The temperature gradually declined to an ambient temperature of 21° C. The slurry solids were isolated by vacuum filtration, washed twice with 80% aqueous methanol and dried. A polymer solution of 0.48% by weight of solution of the resulting derivatized polymer in deionized water had a Fann 35 (R1B1) viscosity of 36 cp and a D.S. value of 0.08.

The results of this example indicate that polysaccharides may be derivatized at ambient conditions utilizing sodium bromoacetate.

Example 5—Derivatization of Guar using Chloroacetic Acid

The derivatization process began by adding 2.50 g of organophillic clay to 210 g of #2 diesel in a 500 ml resin kettle. The mixture was stirred with a magnetic stirrer. After 5 min., 1.09 g of an ethoxylated fatty alcohol was added and stirred for an additional 10 min. followed by the addition of 120 g of guar gum supplied as "GW-4" by Rhone Poulenc. The resulting amber slurry was degassed with $N_2$ by means of a sparge tube. The slurry was then treated with the rapid addition of 34.04 g of 50% (wt.) aqueous sodium hydroxide. After stirring for an hour with a lightening stirrer, a solution of 15.7 g of 99%+chloroacetic acid (Aldrich) dissolved in 20 g of t-Butanol was added dropwise over 40 min. The slurry was stirred at ambient temperature for another two hours, followed by heating to 90° C. for three hours. The resulting dark brown slurry was cooled and neutralized with 10.7 g of 15% (wt.) hydrochloric acid. The polymer was isolated by vacuum filtration and washed five times in 90% aqueous methanol, filtered and dried. A solution of 0.48% by weight of solution of the resulting derivatized polymer in deionized water had a Fann 50 (R1B1) viscosity of 41 cp and a D.S. value of 0.17.

The results of this example show that, using the disclosed method, chloroacetic acid is an effective agent for derivatizing guar.

TABLE 2

Data for Example 1

Temperature: 150° F.
Instrument: Fann 50C with R1B5 cup and bob geometry
Additives: 1.0 gallon per thousand gallons ("gpt") 50% aqueous tetramethyl ammonium chloride, 15 pounds per thousand pounds ("ppt") polymer from Example 1 (13.5 centapoises (cps)), acetic acid (pH = 4.5) and 0.5 gpt zirconium lactate crosslinker; pH: 4.67, 4.77; Rate: 105 s$^{-1}$
Target pH range: From about 4.5 to about 5
Breaker: None

| TIME (min.) | TEMP (° F.) | n' | K (dyne/cm$^2$) | Viscosity (at 105 s$^{-1}$) | Viscosity (at 85 s$^{-1}$) | Viscosity (at 42 s$^{-1}$) |
|---|---|---|---|---|---|---|
| 4 | 78 | .318 | 35.2168 | 147 | 170 | 275 |
| 34 | 151 | .63 | 11.4042 | 204 | 220 | 286 |
| 64 | 147 | .693 | 9.4724 | 227 | 242 | 301 |
| 94 | 148 | .643 | 11.5438 | 219 | 236 | 304 |
| 124 | 148 | .671 | 9.8142 | 212 | 228 | 287 |
| 151 | 148 | .654 | 10.197 | 204 | 219 | 280 |
| 180 | 148 | .69 | 8.2749 | 196 | 209 | 260 |
| 210 | 148 | .67 | 8.6764 | 187 | 200 | 253 |
| 240 | 148 | .685 | 7.7673 | 179 | 192 | 239 |
| 270 | 148 | .808 | 4.3174 | 177 | 184 | 211 |
| 300 | 148 | .787 | 4.527 | 168 | 176 | 204 |
| 330 | 148 | .73 | 5.6446 | 161 | 170 | 206 |
| 360 | 148 | .699 | 6.3509 | 156 | 167 | 206 |
| 390 | 148 | .674 | 6.8788 | 151 | 162 | 203 |
| 420 | 148 | .703 | 5.8489 | 147 | 167 | 193 |
| 450 | 148 | .722 | 5.2208 | 143 | 152 | 185 |
| 480 | 148 | .74 | 4.6623 | 139 | 147 | 176 |
| 510 | 148 | .768 | 4.015 | 136 | 143 | 169 |
| 540 | 148 | .739 | 4.4826 | 133 | 141 | 169 |
| 570 | 149 | .739 | 4.355 | 129 | 137 | 164 |
| 600 | 148 | .855 | 2.5534 | 130 | 134 | 149 |
| 630 | 149 | .753 | 3.9082 | 124 | 130 | 155 |
| 660 | 148 | .702 | 4.8115 | 120 | 128 | 158 |
| 690 | 149 | .754 | 3.7422 | 119 | 125 | 149 |
| 720 | 149 | .803 | 2.9517 | 118 | 123 | 141 |
| 750 | 149 | .793 | 3.0058 | 115 | 120 | 139 |
| 780 | 149 | .78 | 3.1581 | 113 | 119 | 139 |
| 810 | 149 | .795 | 2.8888 | 111 | 116 | 134 |
| 840 | 149 | .754 | 3.4307 | 109 | 115 | 137 |
| 870 | 149 | .751 | 3.3645 | 106 | 111 | 133 |
| 900 | 149 | .813 | 2.5348 | 106 | 110 | 126 |
| 930 | 149 | .731 | 3.5882 | 103 | 109 | 131 |
| 960 | 149 | .746 | 3.3135 | 102 | 107 | 128 |
| 1049 | 94 | .655 | 8.5715 | 172 | 185 | 236 |

TABLE 3

Data for Example 2

Temperature: 225° F.
Instrument: Fann 50C with R1B5 cup and bob geometry.
Additives: 1.0 gpt 50% aqueous tetramethyl ammonium chloride, 15 ppt polymer made in Example 1 (13.5 cps), 10 ppt sodium thiosulfate, 0.5 gpt 46% aqueous KOH and 0.7 gpt zirconium lactate crosslinker; pH: 11.40, 1050; Interim Rate: 105 s$^{-1}$
Target pH range: From about 10 to about 11.5
Breaker: None

| TIME (min.) | TEMP (° F.) | n' | K (dyne/cm$^2$) | Viscosity (at 105 s$^{-1}$) | Viscosity (at 85 s$^{-1}$) | Viscosity (at 42 s$^{-1}$) |
|---|---|---|---|---|---|---|
| 4 | 98 | .545 | 70.5602 | 849 | 935 | 1288 |
| 34 | 229 | .552 | 19.4097 | 241 | 265 | 364 |
| 64 | 230 | .518 | 17.1433 | 182 | 201 | 283 |
| 94 | 229 | .508 | 15.7621 | 160 | 177 | 251 |
| 124 | 229 | .511 | 14.1648 | 145 | 161 | 228 |
| 154 | 229 | .533 | 11.9797 | 136 | 150 | 209 |
| 171 | 228 | .518 | 12.2489 | 130 | 144 | 202 |
| 201 | 226 | .547 | 10.1492 | 123 | 136 | 187 |
| 231 | 226 | .528 | 10.3501 | 115 | 127 | 177 |

TABLE 3-continued

Data for Example 2

Temperature: 225° F.
Instrument: Fann 50C with R1B5 cup and bob geometry.
Additives: 1.0 gpt 50% aqueous tetramethyl ammonium chloride, 15 ppt polymer made in Example 1 (13.5 cps), 10 ppt sodium thiosulfate, 0.5 gpt 46% aqueous KOH and 0.7 gpt zirconium lactate crosslinker; pH: 11.40, 1050; Interim Rate: 105 s$^{-1}$
Target pH range: From about 10 to about 11.5
Breaker: None

| TIME (min.) | TEMP (° F.) | n' | K (dyne/cm$^2$) | Viscosity (at 105 s$^{-1}$) | Viscosity (at 85 s$^{-1}$) | Viscosity (at 42 s$^{-1}$) |
|---|---|---|---|---|---|---|
| 261 | 226 | .536 | 9.2335 | 107 | 118 | 163 |
| 291 | 226 | .575 | 7.1387 | 99 | 108 | 146 |
| 320 | 226 | .546 | 7.5314 | 91 | 100 | 138 |
| 350 | 226 | .532 | 7.5052 | 85 | 94 | 131 |
| 380 | 226 | .549 | 6.4993 | 80 | 88 | 120 |
| 410 | 226 | .568 | 5.5464 | 74 | 81 | 110 |
| 440 | 226 | .599 | 4.5835 | 71 | 77 | 102 |
| 470 | 226 | .597 | 4.4039 | 67 | 73 | 98 |
| 500 | 226 | .572 | 4.6816 | 64 | 70 | 95 |
| 530 | 226 | .575 | 4.3245 | 60 | 65 | 88 |
| 560 | 226 | .563 | 4.3485 | 57 | 62 | 85 |
| 590 | 226 | .562 | 4.161 | 54 | 59 | 81 |
| 620 | 226 | .556 | 4.0532 | 51 | 56 | 77 |
| 650 | 226 | .535 | 4.1969 | 48 | 53 | 74 |
| 680 | 226 | .589 | 3.124 | 46 | 50 | 67 |
| 710 | 226 | .604 | 2.7953 | 44 | 48 | 64 |
| 740 | 226 | .605 | 2.6328 | 42 | 46 | 60 |
| 770 | 226 | .604 | 2.5281 | 40 | 44 | 58 |
| 800 | 226 | .631 | 2.1571 | 39 | 42 | 54 |
| 830 | 226 | .595 | 2.3723 | 36 | 39 | 52 |
| 860 | 226 | .572 | 2.5344 | 35 | 38 | 51 |
| 890 | 225 | .691 | 1.4129 | 34 | 36 | 45 |
| 920 | 99 | .627 | 3.8742 | 68 | 74 | 96 |

Example 6—Rheological Evaluation of Polymer Prepared in Example 5 and Comparison to Underivatized Starting Polymer The polymer prepared in Example 5 was evaluated for its Theological performance as a gelant in low pH fracturing fluids. The performance data is presented in Table 4. For comparison, the Theological performance of the underivatized, starting guar gum is presented in Table 5. Both fluids were prepared by hydrating 3.0 g of polymer in 1L of water. After mixing for about 30 minutes, 1 ml of 50% aqueous tetramethylammonium chloride solution was added and the pH of the solution was reduced to 5.13 (for the derivatized guar) and to 5.23 (for the guar gum) with glacial acetic acid. Lastly, 0.5 ml of zirconium lactate crosslinking solution (5.3% ZrO$_2$) was added with excessive shear for about 30 sec. The product formed a thin polymer solution.

The rheological performance of the resulting gel was evaluated by placing 45 g of gel on the Fann 50C. The test conditions and analysis methods were identical to those described in Example 2. Data for the derivatized polymer is presented in Table 4 and data for the underivatized polymer in Table 5. As shown, the derivatized polymer generates viscosity values that are applicable or suitable for most fracturing treatment applications. The underivatized polymer performance, in comparison, is significantly inferior. The current trend in the industry is for target viscosity to exceed 200 cp at 42 s$^{-1}$ for the fluid to adequately suspend proppant. This data also suggests that the disclosed method of derivatization is applicable to produced polymers suited for fracturing fluids.

TABLE 4

Data for Derivatized Polymer of Example 6

Temperature: 150° F.
Additives: 1 gpt 50% aqueous tetramethylammonium chloride solution, 25 ppt polymer from example 5, glacial acetic acid (pH: 5.13) and 0.5 gpt zirconium lactate crosslinker

| Time (min) | Temp (° F.) | N' | K' (dyne/cm$^2$) | Viscosity (cp) 105 s$^{-1}$ | Viscosity (cp) 85 s$^{-1}$ | Viscosity (cp) 42 s$^{-1}$ |
|---|---|---|---|---|---|---|
| 5 | 78 | 0.575 | 3.354 | 46 | 51 | 69 |
| 35 | 158 | 0.255 | 92.885 | 290 | 339 | 574 |
| 65 | 150 | 0.308 | 76.416 | 305 | 353 | 575 |
| 94 | 148 | 0.307 | 78.427 | 312 | 361 | 588 |
| 124 | 150 | 0.33 | 71.535 | 316 | 365 | 585 |
| 153 | 150 | 0.315 | 77.692 | 321 | 370 | 600 |
| 183 | 151 | 0.333 | 72.938 | 327 | 377 | 603 |
| 213 | 101 | 0.371 | 72.380 | 388 | 443 | 690 |
| 243 | 86 | 0.375 | 74.828 | 408 | 466 | 724 |

TABLE 5

Data for Underivatized Polymer of Example 6

Temperature: 150° F.
Additives: 1 gpt 50% aqueous tetramethylammonium chloride solution, 25 ppt guar gum (Aqualon), glacial acetic acid (pH: 5.23) and 0.5 gpt zirconium lactate crosslinker.

| Time (min) | Temp (° F.) | N' | K' (dyne/cm$^2$) | Viscosity (cp) 105 s$^{-1}$ | Viscosity (cp) 85 s$^{-1}$ | Viscosity (cp) 42 s$^{-1}$ |
|---|---|---|---|---|---|---|
| 5 | 78 | 0.53 | 3.328 | 37 | 41 | 57 |
| 35 | 160 | 0.686 | 3.215 | 75 | 80 | 99 |
| 64 | 150 | 0.816 | 1.702 | 72 | 75 | 86 |
| 94 | 146 | 0.821 | 1.574 | 68 | 71 | 81 |
| 124 | 102 | 0.69 | 3.954 | 93 | 100 | 124 |

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method for forming derivatized polymer material in a slurry, comprising:

combining an organic solvent based slurry containing polymer material with a basic compound or alkaline material at ambient temperature to activate derivatizing sites on the polymer material;

then combining said slurry containing polymer material with a derivatizing agent at ambient temperature to cause at least partial mixing to occur between said polymer material and said derivatizing agent; and allowing said polymer material and said derivatizing agent to at least partially react with no heating to form derivatized polymer material contained in said slurry;

wherein said slurry containing polymer material is combined with said basic compound or alkaline material prior to combination of said slurry containing polymer material with said derivatizing agent;

wherein said polymer material comprises a hydratable polysaccharide, hydratable derivatized polysaccharide, or a mixture thereof; and wherein said organic solvent based slurry comprises a hydrocarbon solvent that is at least one of diesel, kerosene, refined aliphatic oil, or a mixture thereof.

2. The method of claim 1, wherein said method further comprises combining said derivatized polymer-containing slurry with an aqueous solution, wherein said polymer material interacts with said aqueous solution to form a hydrated derivatized polymer-containing treatment fluid; and introducing said treatment fluid into a well.

3. The method of claim 1, wherein said polymer material comprises at least one of guar, derivatized guar, derivatized cellulose, starch, or a mixture thereof.

4. The method of claim 1, wherein said derivatizing agent is combined with said organic solvent in an amount of from 6% to about 30% by weight of said polymer material; and wherein said polymer material comprises guar particles having a size of between about 60 mesh and about 400 mesh.

5. The method of claim 1, wherein said derivatizing agent comprises at least one of alkylene oxide, alkali metal haloacetate, haloacetic acid, or a mixture thereof.

6. The method of claim 1, wherein said derivatizing agent comprises at least one of alkali metal haloacetate, haloacetic acid, or a mixture thereof.

7. The method of claim 1, wherein said derivatizing agent comprises at least one of sodium chloroacetate, sodium bromoacetate, chloroacetic acid, bromoacetic acid, propylene oxide, or a mixture thereof.

8. The method of claim 1, wherein said derivatizing agent comprises at least one of sodium chloroacetate, chloroacetic acid or a mixture thereof.

9. The method of claim 1, wherein said polymer material comprises guar; wherein said derivatizing agent comprises sodium chloroacetate, chloroacetic acid, or a mixture thereof, and wherein said derivatized polymer material comprises carboxymethyl guar.

10. The method of claim 1, wherein said organic solvent based slurry containing polymer material comprises a viscosifier and dispersant.

11. The method of claim 10, wherein said viscosifier comprises organophilic clay and said dispersant comprises an ethoxylated alcohol.

12. The method of claim 1, further comprising combining said slurry containing derivatized polymer material with an acidic agent or compound after combining said slurry containing polymer material with said derivatizing agent.

13. The derivatized polymer material contained in a slurry and produced by the method of claim 1.

14. A method for treating a well, comprising:

combining a polymer material with an organic solvent to form a polymer-containing slurry;

then combining said polymer-containing slurry with a basic compound or alkaline material at ambient temperature to activate derivatizing sites on the polymer material;

then combining said polymer-containing slurry with a derivatizing agent at ambient temperature to cause at least partial mixing to occur between said polymer material and said derivatizing agent;

allowing said polymer material and said derivatizing agent to react to form a derivatized polymer-containing slurry;

combining said derivatized polymer-containing slurry with an aqueous solution, wherein said polymer material interacts with said aqueous solution to form a hydrated derivatized polymer-containing treatment fluid; and introducing said treatment fluid into said well;

wherein said polymer-containing slurry is combined with said basic compound or alkaline material prior to combination of said polymer-containing slurry with said derivatizing agent.

15. The method of claim 14, wherein said polymer material comprises a water soluble high molecular weight polyhydric polymer having a molecular weight of greater than about 100,000.

16. The method of claim 14, wherein said polymer material comprises a hydratable polysaccharide, hydratable derivatized polysaccharide, or a mixture thereof.

17. The method of claim 14, wherein said polymer material comprises at least one of guar, derivatized guar, derivatized cellulose, starch, polyvinyl alcohol, or a mixture thereof.

18. The method of claim 14, wherein said polymer material comprises at least one of guar, hydroxypropyl guar, hydroxyethyl cellulose, or a mixture thereof.

19. The method of claim 14, wherein said polymer material comprises guar particles having a size of between about 100 mesh and about 325 mesh.

20. The method of claim 14, wherein said derivatizing agent comprises at least one of alkylene oxide, alkali metal haloacetate, haloacetic acid, or a mixture thereof.

21. The method of claim 14, wherein said derivatizing agent comprises at least one of alkali metal haloacetate, haloacetic acid, or a mixture thereof.

22. The method of claim 14, wherein said derivatizing agent comprises at least one of sodium chloroacetate, sodium bromoacetate, chloroacetic acid, bromoacetic acid, propylene oxide, or a mixture thereof.

23. The method of claim 14, wherein said derivatizing agent comprises at least one of sodium chloroacetate, chloroacetic acid or a mixture thereof.

24. The method of claim 14, wherein said polymer material comprises guar; wherein said derivatizing agent comprises sodium chloroacetate, chloroacetic acid, or a mixture thereof; and wherein said derivatized polymer material comprises carboxymethyl guar.

25. The method of claim 14, wherein said combining a polymer material with an organic solvent to form a polymer-containing slurry comprises dispersing from about 15% to about 50% powdered guar by weight of polymer to weight of final polymer slurry in said hydrocarbon solvent, and wherein said step of combining said polymer-containing slurry with a derivatizing agent comprises adding between 6% and about 30% by weight chloroacetate by weight of polymer to said polymer-containing slurry.

26. The method of claim 14, further comprising combining a viscosifier and a dispersant with said organic solvent prior to combining a polymer material with said organic solvent to form a polymer-containing slurry.

27. The method of claim 26, wherein said viscosifier comprises organophilic clay and said dispersant comprises an ethoxylated alcohol.

28. The method of claim 14, wherein said well penetrates a subterranean formation and wherein said introducing comprises injecting a contents of said hydrated derivatized polymer-containing treatment fluid into said subterranean formation at a pressure above a fracturing pressure of said subterranean formation.

29. The method of claim 14, further comprising combining said hydrated derivatized polymer-containing treatment fluid with a crosslinking agent, wherein said crosslinking agent and said derivatized polymer material react to form crosslinked derivatized polymer material contained in said treatment fluid.

30. The method of claim 14, further comprising
combining said derivatized polymer-containing slurry with an acidic agent or compound prior to said introducing.

31. The method of claim 30, wherein said polymer material comprises polymer particles having a size of between about 38 $\mu$m and about 600 $\mu$m, and further comprising the steps of:
combining said derivatized polymer-containing slurry with an aqueous solution to form a treatment fluid after exposing said derivatized polymer to said acid; and
wherein said step of introducing comprises injecting said treatment fluid into said subterranean formation at a pressure above a fracturing pressure of said subterranean formation.

32. The method of claim 30, wherein said organic solvent comprises a hydrocarbon solvent that is at least one of diesel, kerosene, refined aliphatic oil, or a mixture thereof.

33. The method of claim 14, wherein said combining said derivatized polymer-containing slurry with an aqueous solution occurs within a process stream in a continuous mixing process, and wherein said introducing includes the step of introducing said process stream into said well immediately after said steps of combining said derivatized polymer-containing slurry with an aqueous solution.

34. A method for treating a well, comprising:
combining a guar material with a hydrocarbon solvent to form a slurry containing guar material;
then combining said slurry containing guar material with a basic compound or alkaline material at ambient temperature to activate derivatizing sites on the polymer material;
then combining said slurry containing guar material with a derivatizing agent at ambient temperature to cause at least partial mixing to occur between said guar material and said derivatizing agent;
allowing said guar material and said derivatizing agent to react to form derivatized guar material contained in said slurry;
then combining said slurry containing derivatized guar material with an aqueous solution to form a treatment fluid, wherein said derivatized guar material interacts with said aqueous solution to form hydrated derivatized guar contained in said treatment fluid; and
then introducing said treatment fluid into said well;
wherein said slurry containing guar material is combined with said basic compound or alkaline material prior to combination of said slurry containing guar material with said derivatizing agent.

35. The method of claim 34, wherein said derivatizing agent comprises sodium chroroacetate, chloroacetic acid, or a mixture thereof.

36. The method of claim 34, wherein said derivatizing agent comprises sodium chloroacetate, chloroacetic acid, or a mixture thereof; wherein said derivatized guar material comprises carboxymethyl guar; and further comprising heating said slurry containing guar material to a temperature of between about 20° C. and about 90° C. prior to said reaction between said guar material and said derivatizing agent.

37. The method of claim 34, wherein said well penetrates a subterranean formation and wherein said introducing comprises injecting said treatment fluid into said subterranean formation at a pressure above a fracturing pressure of said subterranean formation.

38. The method of claim 34, wherein said combining said slurry containing guar material with a derivatizing agent includes combining a selected amount of said derivatizing agent with said slurry containing guar material to produce a derivatized guar material having a desired degree of substitution value to fit particular wellbore or downhole criteria.

39. The method of claim 38, wherein said amount of said derivatizing agent is selected to produce a derivatized guar material having a degree of substitution value of between about 0.05 and about 0.25.

40. The method of claim 14, wherein said polymer-containing slurry is combined with said derivatizing agent onsite.

41. The method of claim 14, wherein said method comprises combining a selected amount of said derivatizing agent with said polymer-containing slurry to produce a derivatized polymer material having a desired degree of substitution value to fit particular wellbore or downhole criteria.

42. The method of claim 34, wherein said slurry containing guar material is combined with said derivatizing agent onsite.

43. The method of claim 36, wherein said hydrocarbon solvent comprises at least one of diesel, kerosene, refined aliphatic oil, or a mixture thereof.

44. The method of claim 43, further comprising combining a contents of said treatment fluid containing hydrated derivatized guar with a crosslinking agent, wherein said crosslinking agent and said hydrated derivatized guar react to form crosslinked hydrated derivatized guar.

45. A method for forming derivatized polymer material in a slurry, comprising:
combining an organic solvent based slurry containing polymer material with a basic compound or alkaline material at ambient temperature to activate derivatizing sites on the polymer material;

then combining said slurry containing polymer material with a derivatizing agent at ambient temperature to cause at least partial mixing to occur between said polymer material and said derivatizing agent; and allowing said polymer material and said derivatizing agent to react to form derivatized polymer material contained in said slurry;

wherein said slurry containing polymer material is combined with said basic compound or alkaline material prior to combination of said slurry containing polymer material with said derivatizing agent; and wherein said first two combining steps and said allowing step occur offsite, and further comprising storing said slurry containing derivatized polymer material for transportation and later onsite use.

46. The method of claim 14, wherein said first three combining steps and said allowing step occur offsite, and further comprising storing said slurry containing derivatized guar material for transportation and later onsite use.

47. The method of claim 34, wherein said first three combining steps and said allowing step occur offsite, and further comprising storing said slurry containing derivatized polymer material for transportation and later onsite use.

48. The method of claim 45, further comprising:

transporting said slurry containing derivatized polymer material to a wellsite;

combining said slurry containing derivatized polymer material with an aqueous solution, wherein said derivatized polymer material interacts with said aqueous solution to form a hydrated derivatized polymer-containing treatment fluid; and introducing said treatment fluid into said well.

49. A method for forming derivatized polymer material, comprising:

combining a polymer material with a basic compound or alkaline material at ambient temperature to activate derivatizing sites on the polymer material;

then combining said polymer material with a derivatizing agent at ambient temperature to cause at least partial mixing to occur between said polymer material and said derivatizing agent; and allowing said polymer material and said derivatizing agent to at least partially react with no heating to form derivatized polymer material;

wherein said polymer material is combined with said basic compound or alkaline material prior to combination of said polymer material with said derivatizing agent; and wherein said polymer material comprises at least one of guar, derivatized guar, derivatized cellulose, starch, or a mixture thereof.

50. A method for forming derivatized polymer material in a slurry, comprising:

combining an organic solvent based slurry containing polymer material with a basic compound or alkaline material at ambient temperature to activate derivatizing sites on the polymer material;

then combining said slurry containing polymer material with a derivatizing agent at ambient temperature to cause at least partial mixing to occur between said polymer material and said derivatizing agent; and allowing said polymer material and said derivatizing agent to at least partially react with no heating to form derivatized polymer material contained in said slurry;

wherein said slurry containing polymer material is combined with said basic compound or alkaline material prior to combination of said slurry containing polymer material with said derivatizing agent; and wherein said organic solvent based slurry comprises a hydrocarbon solvent that is at least one of diesel, kerosene, refined aliphatic oil, or a mixture thereof.

51. The method of claim 50, wherein said polymer material comprises at least one of guar, derivatized guar, derivatized cellulose, starch, polyvinyl alcohol, or a mixture thereof.

52. A method for forming derivatized polymer material in a slurry, comprising:

combining an organic solvent based slurry containing polymer material with a basic compound or alkaline material at ambient temperature to activate derivatizing sites on the polymer material;

then combining said slurry containing polymer material with a derivatizing agent at ambient temperature to cause at least partial mixing to occur between said polymer material and said derivatizing agent; and allowing said polymer material and said derivatizing agent to at least partially react with no heating to form derivatized polymer material contained in said slurry;

wherein said slurry containing polymer material is combined with said basic compound or alkaline material prior to combination of said slurry containing polymer material with said derivatizing agent; and wherein said derivatizing agent comprises at least one of alkylene oxide, alkali metal haloacetate, haloacetic acid, or a mixture thereof; and wherein said polymer material comprises at least one of guar, derivatized guar, derivatized cellulose, starch, or a mixture thereof.

53. A method for forming derivatized polymer material in a slurry, comprising:

combining an organic solvent based slurry containing polymer material with a basic compound or alkaline material at ambient temperature to activate derivatizing sites on the polymer material;

then combining said slurry containing polymer material with a derivatizing agent at ambient temperature to cause at least partial mixing to occur between said polymer material and said derivatizing agent; and allowing said polymer material and said derivatizing agent to react to form derivatized polymer material contained in said slurry;

wherein said slurry containing polymer material is combined with said basic compound or alkaline material prior to combination of said slurry containing polymer material with said derivatizing agent; and wherein said organic solvent based slurry containing polymer material further comprises a viscosifier and dispersant.

\* \* \* \* \*

UNITED STATES PATENT AND TRADEMARK OFFICE
CERTIFICATE OF CORRECTION

PATENT NO.     : 6,387,853 B1
DATED          : May 14, 2002
INVENTOR(S)    : Jeffrey C. Dawson et al.

It is certified that error appears in the above-identified patent and that said Letters Patent is hereby corrected as shown below:

Column 23,
Line 13, please delete "hydrocarbon" and insert -- organic --.

Signed and Sealed this

Eighteenth Day of May, 2004

JON W. DUDAS
*Acting Director of the United States Patent and Trademark Office*